(12) United States Patent
O'Rourke

(10) Patent No.: US 8,773,537 B2
(45) Date of Patent: *Jul. 8, 2014

(54) NIGHT VISION SYSTEM

(71) Applicant: Brian O'Rourke, Virginia Beach, VA (US)

(72) Inventor: Brian O'Rourke, Virginia Beach, VA (US)

(73) Assignee: DevCar, LLC, Virginia Beach, VA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/766,494

(22) Filed: Feb. 13, 2013

(65) Prior Publication Data

US 2013/0155244 A1  Jun. 20, 2013

Related U.S. Application Data

(63) Continuation-in-part of application No. 12/589,695, filed on Oct. 27, 2009, now Pat. No. 8,400,510.

(60) Provisional application No. 61/197,259, filed on Oct. 27, 2008.

(51) Int. Cl.
*H04N 7/18* (2006.01)

(52) U.S. Cl.
USPC ........................................................ 348/158

(58) Field of Classification Search
USPC ............ 348/158, E07.085; 350/36, 135, 158, 350/164, E07.085
See application file for complete search history.

(56) References Cited

U.S. PATENT DOCUMENTS

| | | | | |
|---|---|---|---|---|
| 4,449,787 A * | 5/1984 | Burbo et al. | ................... | 313/524 |
| 4,563,061 A * | 1/1986 | Ellis | ............................... | 359/364 |
| 4,775,217 A * | 10/1988 | Ellis | ............................... | 313/524 |
| 4,828,378 A * | 5/1989 | Ellis | ............................... | 359/400 |
| 5,371,355 A | 12/1994 | Wodecki | | |
| 5,617,257 A | 4/1997 | Sheehy et al. | | |
| 5,619,807 A * | 4/1997 | Conrad | ........................... | 34/414 |
| 5,629,807 A | 5/1997 | Hall | | |
| 5,648,862 A | 7/1997 | Owen | | |
| 5,703,354 A * | 12/1997 | Wannagot et al. | ...... | 250/214 VT |
| 6,008,779 A * | 12/1999 | Ellis | ................................. | 345/8 |
| 6,087,660 A * | 7/2000 | Morris et al. | ................. | 250/330 |
| 6,271,511 B1 * | 8/2001 | Pierle | ...................... | 250/214 VT |
| 6,411,451 B1 | 6/2002 | Fliss et al. | | |
| 6,560,029 B1 | 5/2003 | Dobbie et al. | | |
| 6,862,748 B2 | 3/2005 | Prendergast | | |
| 7,211,778 B1 | 5/2007 | Smith | | |
| 7,219,370 B1 | 5/2007 | Teetzel et al. | | |
| 8,243,103 B2 | 8/2012 | Dobbie et al. | | |
| 2002/0120979 A1 | 9/2002 | Prendergast | | |
| 2003/0015662 A1 * | 1/2003 | Yang et al. | ................... | 250/330 |
| 2004/0181855 A1 | 9/2004 | Prendergast | | |

(Continued)

*Primary Examiner* — Lashonda Jacobs
(74) *Attorney, Agent, or Firm* — Williams Mullen

(57) ABSTRACT

A night vision system includes an image sensor and circuitry coupled to a digital storage medium or transmitter that periodically samples a signal provided by the image sensor and stores the sampled image to be viewed in near real time or at a later date by a data analyst. The night vision system includes an imaging assembly with a casing surrounding an image intensifier and the associated circuitry along with a port for accepting a power and/or signal cable for providing power to the image assembly and image signal data to the digital storage medium. The system may further include a daytime camera and a switch for toggling the image signal data input to the digital storage medium between the daytime camera and the low light image sensor, as well as a transmission system for wirelessly transmitting signals.

30 Claims, 16 Drawing Sheets

(56) References Cited

U.S. PATENT DOCUMENTS

| | | |
|---|---|---|
| 2006/0081778 A1* | 4/2006 | Warner et al. ............... 250/330 |
| 2007/0084985 A1 | 4/2007 | Smith et al. |
| 2007/0114252 A1* | 5/2007 | Gruebel et al. ............... 224/181 |
| 2007/0214551 A1 | 9/2007 | Teetzel et al. |
| 2008/0007826 A1 | 1/2008 | Smith et al. |
| 2010/0302282 A1 | 12/2010 | Dobbie et al. |
| 2012/0257005 A1 | 10/2012 | Browne |

* cited by examiner

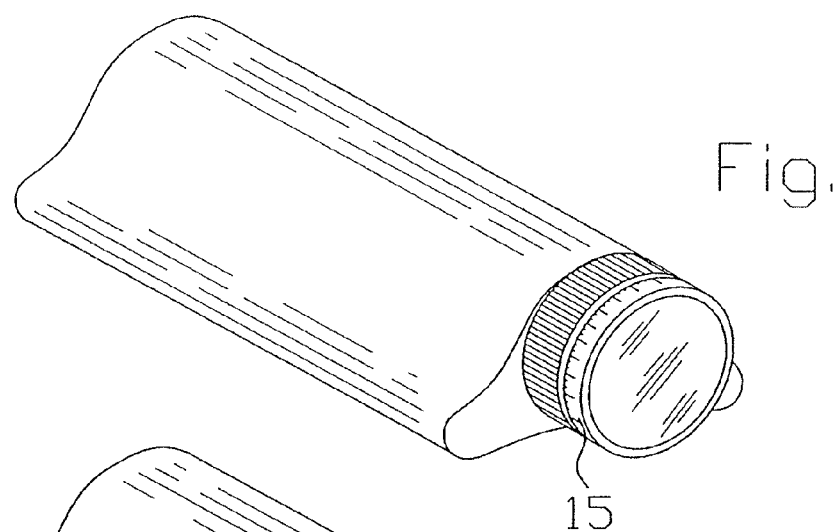
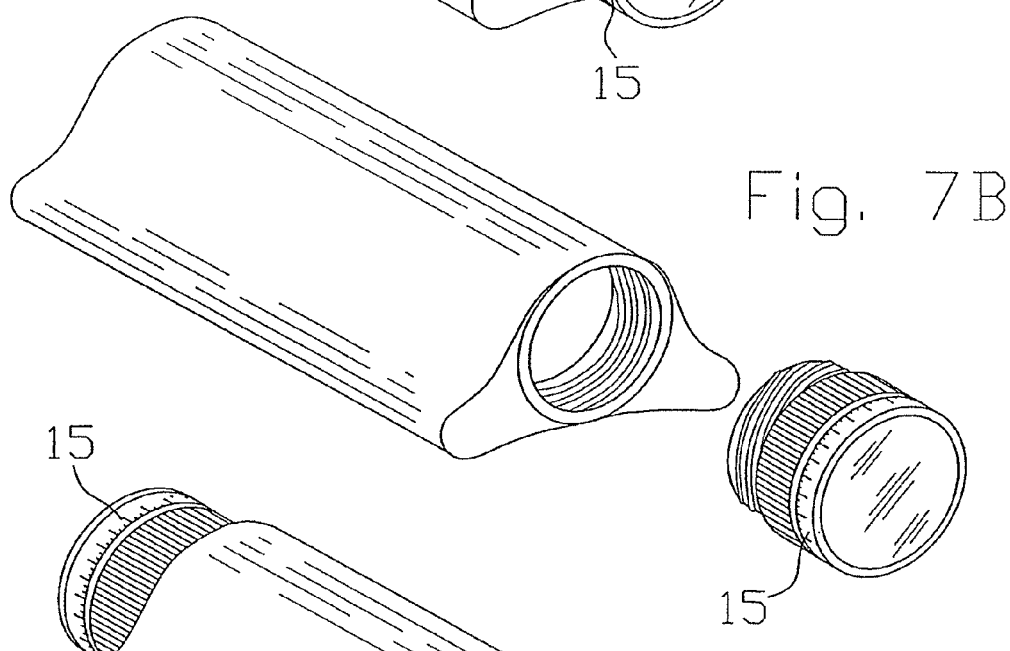
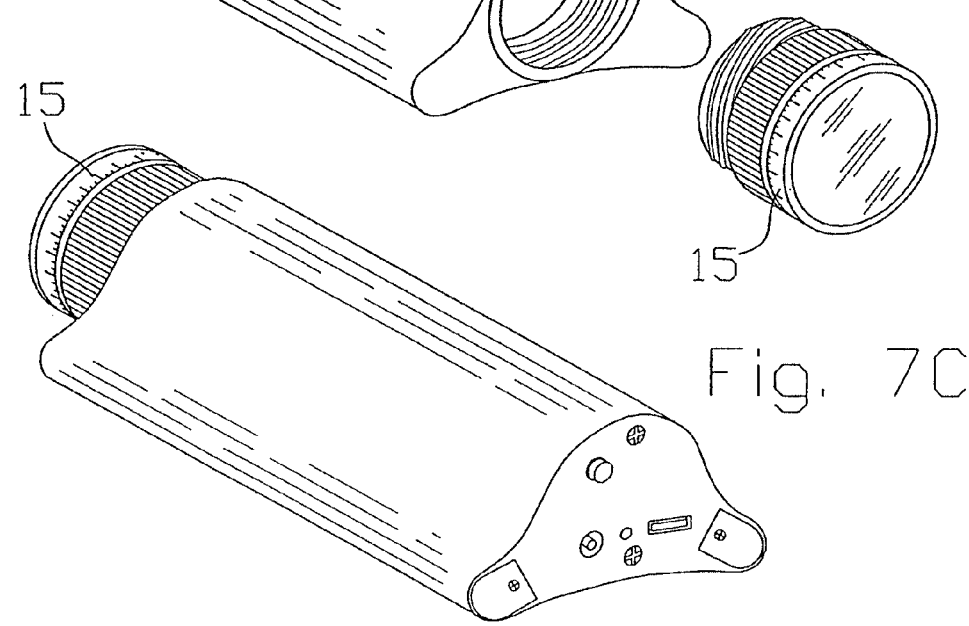

NIGHT VISION SYSTEM

CROSS-REFERENCED TO RELATED APPLICATIONS

This application is a continuation-in-part of application Ser. No. 12/589,695 filed, Oct. 27, 2009, which claims the benefit of provisional Application No. 61/197,259, filed Oct. 27, 2008, both of which are incorporated herein by reference

STATEMENT REGARDING FEDERALLY SPONSORED RESEARCH OR DEVELOPMENT

The present application did not receive any federal research and/or development funding.

FIELD OF THE INVENTION

Generally, the present invention relates to a night vision system deployed by an operator in a field environment. The system may be coupled onto the personal clothing, holsters, protective equipment, working animals such as dogs and their harness or remote devices or the like and used to capture images and store them onto a digital storage medium or transmit them through to remote location through cables or wirelessly. The system includes some type of low light or non-visible image capture device that converts night time images into digital images that may be viewed in real-time, stored in a data storage medium arranged on the operator or at a separate location remote from the assembly or transmitted wirelessly. When deployed as a helmet mounted night vision system, circuitry and an image pathway system couple the image capture device and the storage medium or wireless transmitter together. The digital image may be uploaded or downloaded to create viewable images on a screen and viewed in real-time or at a later date. Otherwise, the night vision system may be arranged as an element of the terrain and arranged to capture images of a specific area or object of interest. In this instance, the night vision system may be equipped with an electronic date stamp for integrating a part date of capture on a particular image. The invention may be useful in sporting activities such as skydiving where hands-free operations are desired.

BACKGROUND OF THE INVENTION

Night vision devices include any system that takes an image displayed in low-light or no light conditions. The systems include any active or passive infra-red, low light or thermal detection systems. The term "field environment" may comprise any environment, including rural and urban environments, in which a surveillance and/or operational action is taken. The night vision system is an image intensifier and associated circuitry and may comprise an integrated power supply coupled to a powered memory storage device having an independent integrated power supply.

Digital camera technology typically includes the use of a sensor that converts light into electrical charges. The image sensor used in many digital cameras is a charge coupled device (CCD). Otherwise, a digital camera may use a complementary metal oxide semiconductor (CMOS) device instead. Both CCD and CMOS image sensors convert light into electrons.

There are a variety of lenses on currently on the market for use with digital cameras. Likewise, night vision devices such scopes, monoculars and binoculars are known. There are certain devices such as sleeves that may be used to couple a scope or monocular to a digital camera to convert it into a device that may be used in low or no light conditions. High quality night time pictures may be taken with such combined devices.

There are several disadvantages realized when performing mobile surveillance with the combined devices. The size of the night vision scope coupled to a camera may exceed two feet in length. Moreover, the sleeve coupling the night vision scope to the camera cannot adequately support the weight of the scope or camera. Both, the scope and camera must be held in one's hands during operation. Thus, the combined scope and camera are not for use as a hands free system. If the scope and camera are mounted on a tripod or other fixed structure, they are rendered immobile and cannot be used in an environment where mobility is necessary. Thus, one cannot carry the camera with a night vision scope coupled thereto and operate it in a "hands free" manner. For purposes of this disclosure, the term "hands free" with respect to operation of the device should be construed to mean a device that is arranged on a user, activated by the user, and thereafter begins taking images and continues doing so until such time as either a power source discharges to such a level that the device cannot properly operate or the user deactivates the device. Moreover, "hands free" means that the size and components of the device is easily carried such that the operator's hands are free to perform other tasks.

SUMMARY OF THE INVENTION

There is a great need in the special operations, infantry, law enforcement community for a helmet mounted night vision system that records, displays or relays wirelessly digital images of night time or low light operations. The present invention aims to satisfy this need. In one instance, the night vision system of the present invention comprises a helmet-mounted image intensifier or night vision device having a first end with an objective lens that accepts photons and a second end that provides digital signals that include images to a single output port or multiple outputs. The image intensifier converts a low light image into a plurality of digital images that are decoded to create surveillance images and sounds. The system may include the image intensifier, at least one microphone, and a memory to record both audio and video signals output from the image intensifier and microphone. Otherwise, a memory, preferably solid state, may be coupled to the image intensifier to periodically sample images provided by the image intensifier and to record the sounds of the microphone and images provided by the image intensifier. A power source provides power to the helmet mounted image intensifier and is connected to the image intensifier through control circuitry. A casing houses the helmet mounted image intensifier and may include a fastening means that couples the night vision system to a harness currently in use by combat and police organizations. This casing may be in tubular form.

In an embodiment where the image intensifier includes an integrated onboard power source, a back end of the casing includes at least one signal/power port and is at least partially removable to create access openings to battery compartments. That is, the casing may include recesses with access openings for depositing batteries into the recesses to create a voltage potential in the onboard power source. The signal-power port may be arranged in the casing for accepting at least a signal end of a cable or signal path, such as IEEE1394, FireWire, I-Link, camera link, Egig, USB etc. The casing may be formed from lightweight materials such as aluminum, composite materials or the like and include integrated electromagnetic shielding for protecting the various internal components when exposed to high electric or magnetic fields. The cable may have a first signal end arranged in the signal-power port of the casing of the image intensifier. The signal cable or path may include a second signal end that transmits at least digital images there through to a memory remote from the intensifier. In an embodiment where the image intensifier tube is mounted atop a helmet, a pair of cables may be coupled together substantially near the night vision device if the memory device is remote from the night vision device. In one instance, the image intensifier tube may be mounted atop a protective helmet worn by a user. In an alternative embodiment, the image intensifier tube may be mounted onto a side of the protective helmet via a Velcro or hook and loop strap that passes across the top of the protective helmet to couple the image intensifier to a memory storage medium and power source housed in and/or operably engaged with a control unit. In another instance, an electronic storage medium may have a signal/power port for accepting the second end of the second cable to receive digital images from the helmet-mounted image intensifier. A second power source connects to the electronic storage medium for providing power thereto. This second power source is coupled to the first power source and includes circuitry that monitors the voltage levels of the first and second power sources. The voltage levels are compared and if necessary, the second power source diverts energy to the first power source to assist in continuing the operation of the image intensifier tube. The memory device may comprise a second camera for use during daytime operations. An onboard switching device may include circuitry that comprises a photocell for determining whether the second camera (daytime) is used or the first camera (nighttime) is used. Otherwise, the switching device may be a manual switch operated by the user to switch between the daytime camera and image intensifier tube.

In another instance, a complete system may be mounted to a helmet or other item of equipment, such as personnel gear, a dog harness, a belt, or a remotely located unit. To avoid extra equipment, the signal could be wirelessly transmitted or relayed by cable to remote display or communications device.

The image intensifier may comprise a first lens with a field of view adapted for the application, typically a field of view may include wide angle and telephoto lenses, and could be arranged at the first end of the mounted image intensifier. This first lens is preferably interchangeable or replaceable, and may include such an adjustable wide angle or zoom lens for capturing close up images of an object of interest. The image intensifier may further include a circuit that steps up the low voltage potential in the first power source to a high voltage potential. A photocathode is arranged in proximity to the first lens. The photocathode converts photons received by the first lens into a first plurality of electrons. A micro-channel plate may be arranged in proximity to the photocathode to convert the first plurality of electrons into a second plurality of electrons having a larger magnitude or number than the first plurality of electrons. A screen may be arranged in proximity to the micro-channel plate and is struck by the second plurality of electrons to reproduce the image of the object of interest. The screen comprises a material that fluoresces when struck by the second plurality of electrons to produce an accurate image representative of the low light image. A semiconductor image chip converts the image representative of the low light image into a digital signal which may be displayed on a screen for the operator and/or which may be routed to the memory to be stored in the memory for viewing at a later date. A second lens may be arranged between the screen and the image sensor or semiconductor image chip to focus the image representative of the low light image onto the semiconductor image chip.

In an additional embodiment, the night vision device or system may include a plurality of fiber optics arranged between the screen and the image sensor or semiconductor image chip to focus the image representative of the low light image onto the image sensor or semiconductor image chip. The semiconductor image chip may either be a CCD or CMOS based chip for accepting the image and converting it into a digital format. Other signal processing circuitry may be utilized for converting any analog images into digital signals.

The night vision system may be provided with any of a variety of power supply options. For example, the image intensifier tube may be provided with an integrated first power source that is stand alone and not coupled to another power source. Likewise, the memory may be mounted into a casing that surrounds the image intensifier tube or be remote from it. Otherwise, the system may further include an embodiment wherein the second power source connects to either the first power source or a high voltage power source that surrounds one or more selected from a group consisting of the photocathode and the micro-channel plate and for providing power thereto. In a further instance, a single power source may be included in a control unit housing the memory storage device to provide power to both the memory storage device and the image intensifier tube. An audio circuit including a microphone arranged in the housing of the control unit or the image intensifier may be incorporated into the night vision system for simultaneously recording audio data. The entire system may be arranged atop a helmet or other mounting arrangement, and may include a port for accepting a memory stick or flash drive.

It is an object of the invention to teach a lightweight, night vision system that can be mounted on a user and easily deployed. In one instance, the lightweight, night vision system includes an image enhancer arranged in a casing that includes lobes which act as stabilizers when remotely deployed. An image transmission device is arranged in substantial proximity to the image enhancer. An image detection chip is arranged in proximity to the image transmission device to convert a detected image into a digital signal representative thereof. A digital signal transmitter connects to the image detection chip and transmits the digital signals to a storage medium.

It is an object to provide a night vision system comprising an image enhancer that converts a low light or no light IR image into a digital image that is stored in a digital storage medium arranged remote from the night vision device. The digital storage medium includes a separate power supply that may be harnessed to aid in operating the night vision system.

It is a further object of the invention to provide a night vision system that includes an image intensifier or image enhancement tube coupled to an image sensor and having a first power source. The image sensor may be coupled to a digital storage medium via a military specifications cable or signal path having weatherproof connectors. The cable is a signal and/or power cable or circuitry that transfers the digital images from the image sensor to the digital storage medium. Alternatively, the signal path may be wireless transmitter and receiver. The cable may also be used to relay power from a second power source to the first power source. Otherwise, the system may include a single power source. A switching circuit may be included in a casing to form an image assembly, with the protective casing housing the image intensifier or image enhancement tube for recharging the first power source or aiding in operating the image enhancement tube and image sensor.

Such a system permits a variety of options or alternative embodiments while satisfying the object herein. For example, it is contemplated that such a system may be adaptable to mounting on gear used with working animals and/or their harnesses, or to mount with a remote viewing device such as a remote flying device or robot. Image signals or related information discussed herein may be subject to wireless control or wireless transmission. In other words, the images or control signals may be sent or received via a communications device in order to send digital images over a wireless network. A variety of image sensors may be used for image capture, such as SWIR (short wave infrared range) sensor, low light CCD or CMOS sensors, or thermal imagers.

These and other objects and advantages of the invention will be set forth, appear in part or become apparent after considering the specification and accompanying drawings. It is to be realized that the following embodiments of the invention have been represented in their simplest form for ease in understanding the invention. Additionally, the system may be used for distant surveillance and include removable lenses. The night vision device may include multiple outputs for audio and video recordings.

DESCRIPTION OF THE DRAWINGS

FIG. 7A shows a front perspective view of the housing of the image intensifier tube equipped with an adjustable zoom lens having graduated marks for focusing the first lens at a distance. FIG. 7B shows the housing with the zoom lens removed. FIG. 7C is a back perspective view of the housing of the image intensifier device and showing a power switch and a pair of signal and/or power ports.

DETAILED DESCRIPTION

Figure 1A:
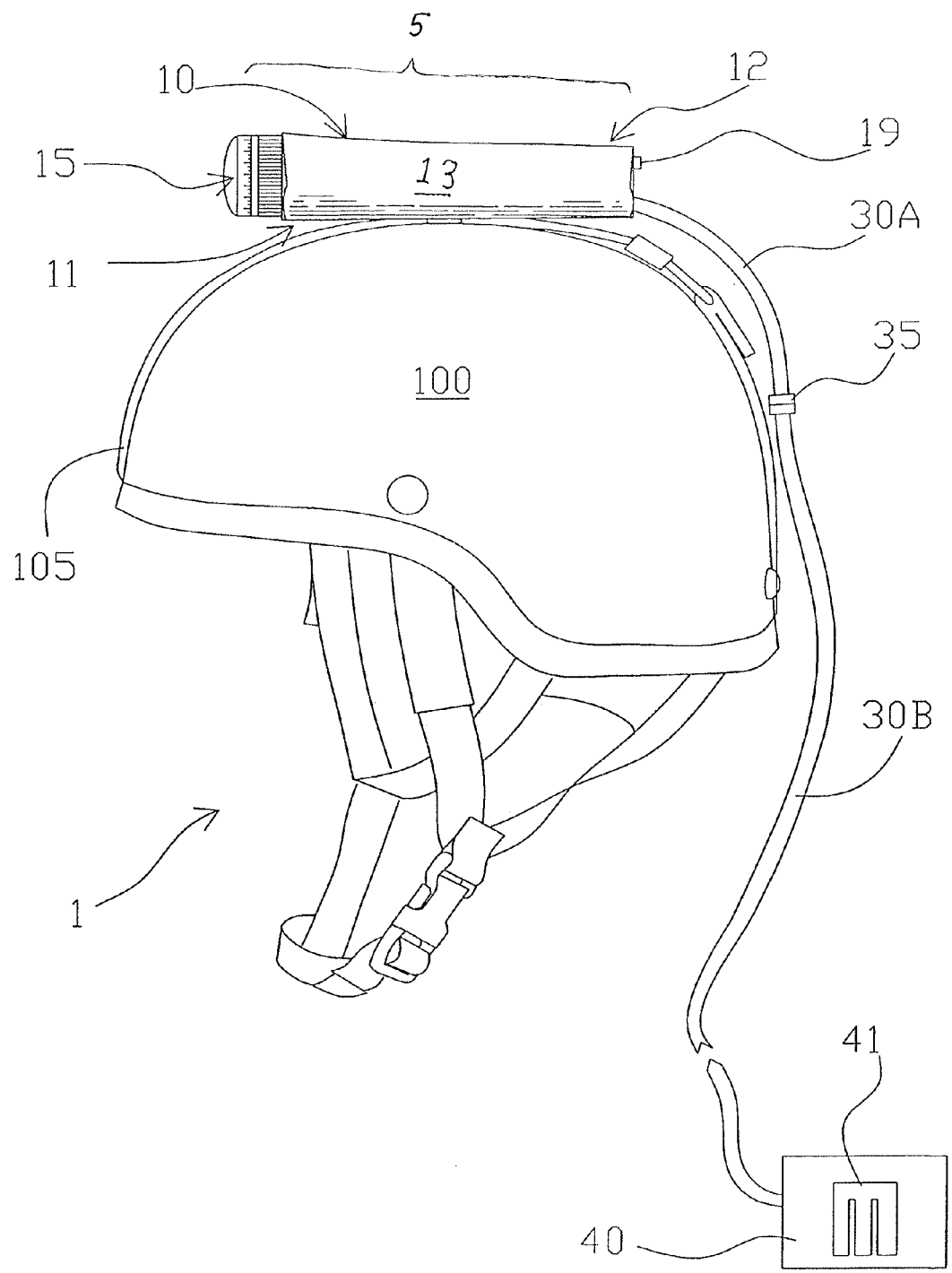
FIG. 1A is a perspective side view of the night vision system with an image intensifier device fastened atop a helmet and a control unit arranged remote there from and coupled to the image intensifier device via a cord having multiple signal and/or power conductors.

The embodiments of the invention and the various features and advantageous details thereof are more fully explained with reference to the non-limiting embodiments and examples that are described and/or illustrated in the accompanying drawings and set forth in the following description. It should be noted that the features illustrated in the drawings are not necessarily drawn to scale, and the features of one embodiment may be employed with the other embodiments as the skilled artisan recognizes, even if not explicitly stated herein. Descriptions of well-known components and techniques may be omitted to avoid obscuring the invention. The examples used herein are intended merely to facilitate an understanding of ways in which the invention may be practiced and to further enable those skilled in the art to practice the invention. Accordingly, the examples and embodiments set forth herein should not be construed as limiting the scope of the invention, which is defined by the appended claims. Moreover, it is noted that like reference numerals represent similar parts throughout the several views of the drawings.

An objective, exposed lens having a nominal field of view in a range appropriate for the application. For example, some embodiments may have a field of view of between seventy and one hundred millimeters degrees, or preferably ninety to one hundred degrees. The lens may be arranged at a front end of the night vision device to face an object of interest. The lens captures light and directs it onto a photon-to-electron converter arranged in an image intensifier, in some embodiments configured as a tube. The photon-to-electron converter receives the photons of light captured by the lens and provides an output of a first plurality of electrons. The image intensifier may include circuitry to amplify the voltage created by a power source, such as a pair of batteries, and output a higher voltage to operate the various components for realizing a night vision system. The number of the first plurality of electrons may be increased by passing them through a microchannel plate (MCP) in the intensifier to create a larger number or amount of a second plurality of electrons. The second plurality of electrons may exit the MCP and may be directed onto a fluorescing screen to create an accurate image of the object of interest. An image sensor may be arranged in close proximity to the screen to convert the accurate image into an image signal that may be stored or saved in a digital data storage medium, viewed by an operator, transmitted for use, or saved elsewhere and reviewed in an after action review.

Figure 12:
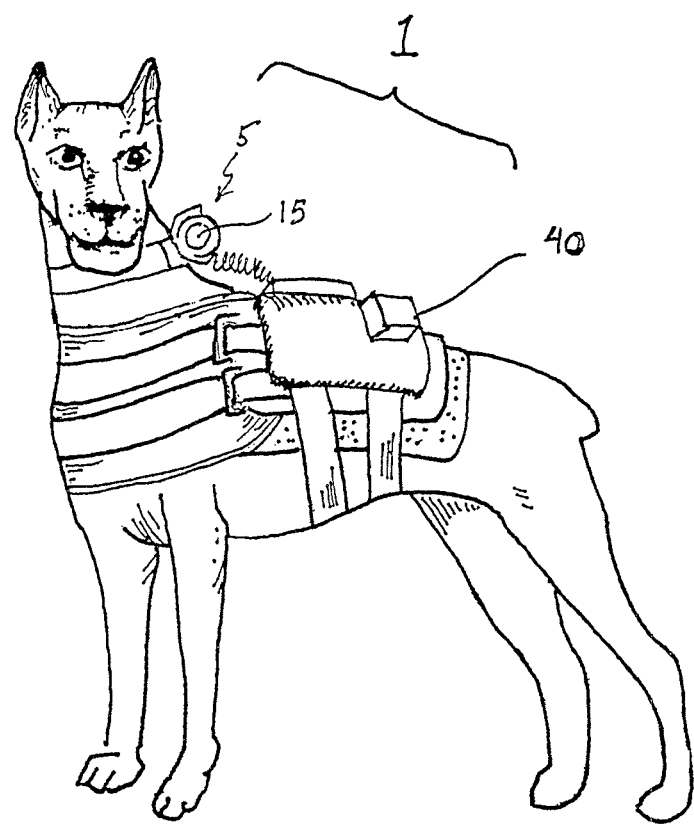
FIG. 12 is an illustration of a canine mounted system.
Figure 15:
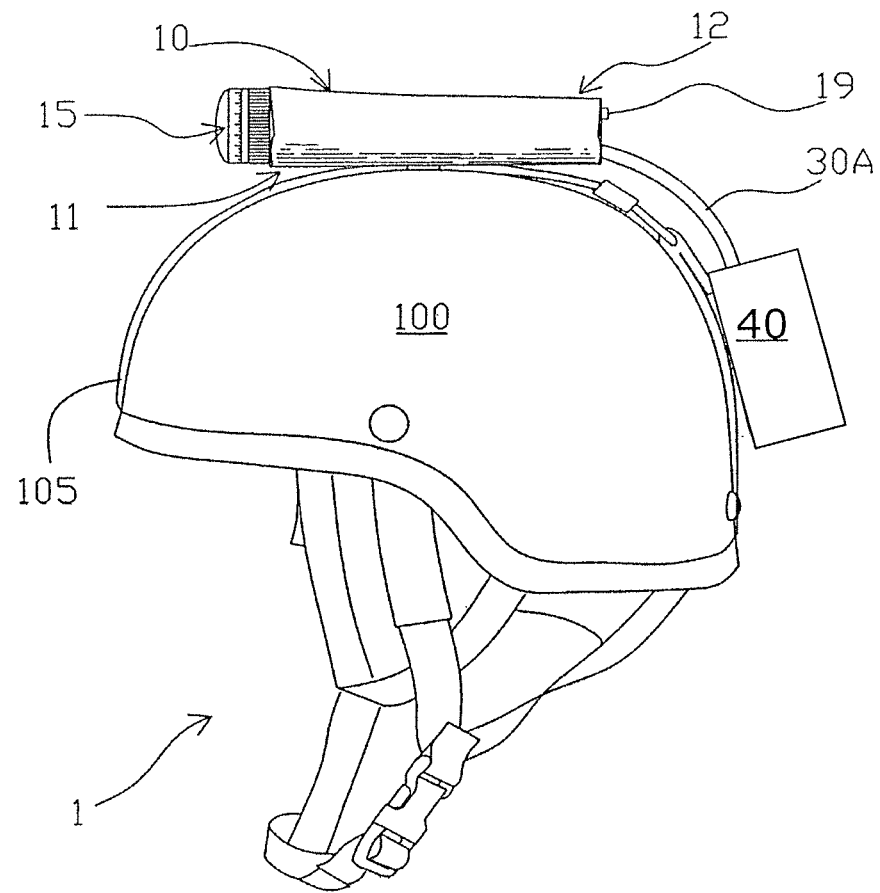
FIG. 15 is a perspective side view of the night vision system with an image intensifier device and a control unit mounted on a helmet.

FIG. 1A shows an embodiment of a night vision system 1, with a portion arranged atop helmet 100; an aspect of this embodiment is that this portion may be fastened thereto by a mounting device 105, such as a strap or Velcro style hook and loop fastener arrangement. Alternate embodiments may involve mounting the entire system 1 on helmet 100, as may be seen in FIG. 15. In the first embodiment of FIG. 1A, the image intensifier 10 may be fastened to a mounting device 105 in strap form via a strap opening formed in and arranged on a bottom of a protective case 13 (See also FIG. 1B). In a second embodiment mounting device 105 may simply engage with a receptacle affixed to a host, which host or wearer may be human, animal (e.g., FIG. 12), machine, or to equipment worn on the body of such a host or wearer. In applications with equipment rails, such as a helmet rail, MIL-STD-1913 rail, STANAG 2324 rail, or other tactical rail, mounting device 105 may be a securing device to operably engage or mate with the attachment system presented by such rail. The image intensifier 10 may have a front end 11 and a back end 12 (provided for reference). Lens 15 may be arranged at a front end of the night vision device 10, in an exposed manner, for capturing photons within the light spectrum from near infrared and visible light. Front end 11 (or first end) in this case means aligned in a line-of-sight for capturing an image of an object of interest. Back end 12 (or second end) is meant to convey an end sufficiently opposite so as to avoid interference with lens 15 at front end 11. For ease of reference, image intensifier 10 and its supporting elements (e.g., lens 15, image sensor 73, etc.), when disposed within or referred to in conjunction with protective case 13, may also be referred to as an "imaging assembly 5." Optionally, the night vision system 1 may include an infrared light source 109 (e.g., FIG. 9A) attached thereto to emit infrared light to enhance capability of image intensifier 10 to gather light.

Figure 3:
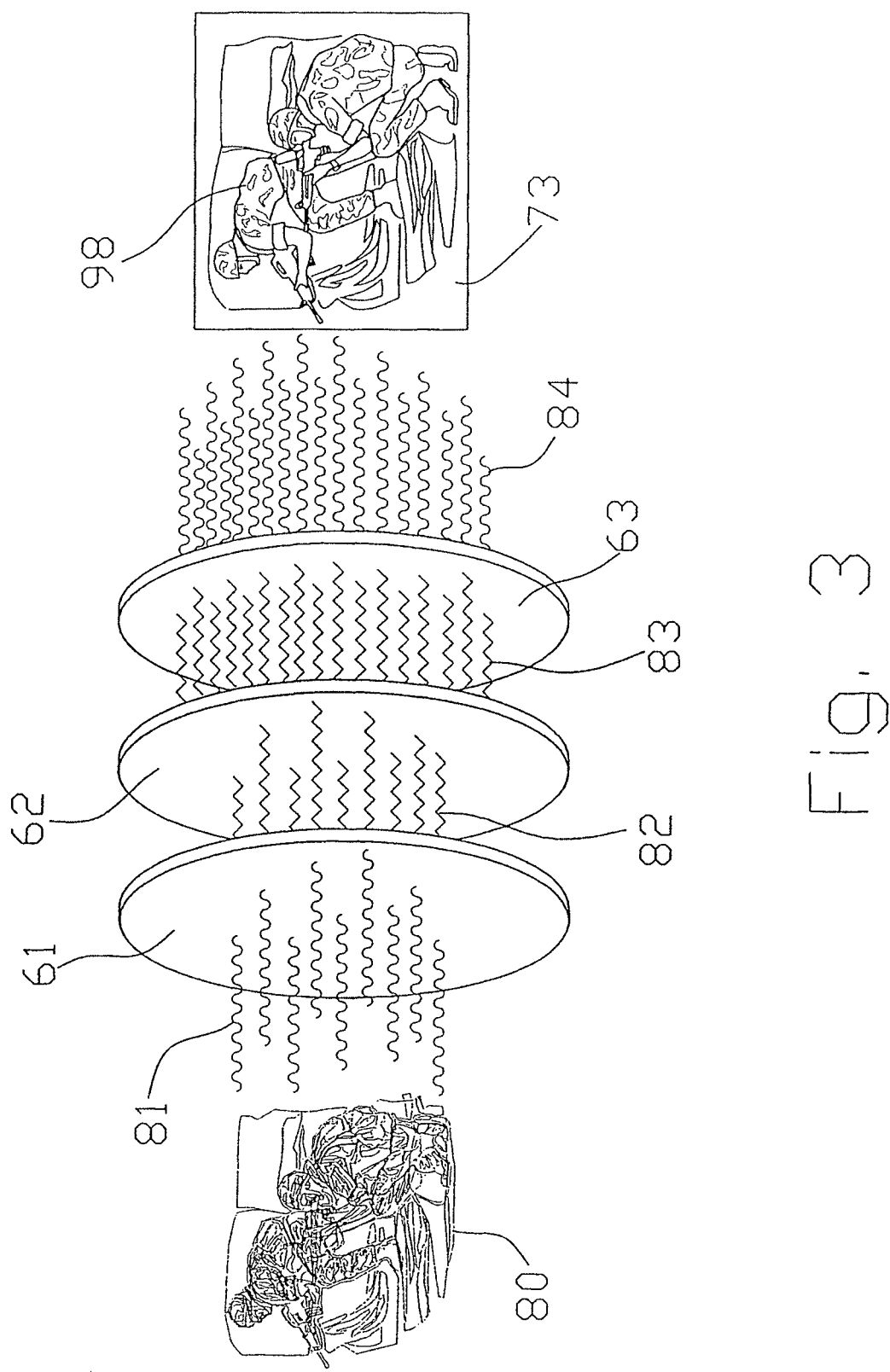
FIG. 3 shows the process steps for converting a night time or low light image to a stored image.

As can be understood by the embodiment shown in FIG. 3, photons 81 from a night or low light image may be passed through the objective or first lens 15 and into a photon to electron converter 61 such as a photocathode. The photocathode converts the photons into a first plurality of electrons 82 which may be directed into a micro channel plate or electron multiplier 62 that converts the first plurality of electrons 82 into a second, larger plurality of electrons 83. The second plurality of electrons 83 may be directed onto a phosphor or fluorescing screen 63 to produce photons 84 which create a visible image 98 of the night time or low light image 80. This visible image may then be directed onto an image detector or sensor 73, such as a CCD or CMOS chip which converts the detected image into a digital image signal or an electronic signal representative of the low light image of the object of interest. For purposes of this disclosure, it is to be understood that the various signal processing necessary for converting the visible image into an image signal may be provided onboard the image detector or sensor 73. For example, an analog-to-digital process may be provided on the image detector or sensor 73 if it is a CMOS chip. Alternative embodiments of image intensifiers 10 may include short wave infrared image sensors, thermal energy image sensors (e.g., thermographic cameras), low light charge coupled devices, complementary metal oxide semiconductors.

In one embodiment, the back or second end 12 of the night vision device 10 may include a power switch 19 for energizing the components of the night vision device 10. It should be noted that if the power source for operating the image intensifier 10 is arranged remote from the image intensifier 10, such as in a control unit 40, then the power switch 19 may be located in either a tube casing or control unit casing as easily understood by the skilled artisan. In this embodiment, a short signal-power cord, conductor, or wire 30A may extend from the back end 12 and includes a connector 35 that connects to a longer signal-power cord, conductor, or wire 30B which extends from the data storage device of control unit 40. The signal-power cords may be a USB or FireWire style cord or flexible cable that includes both power and signal conductors (also referred to interchangeably as a signal path) arranged therein. That is, such a cord may include multiple conductors, with some also forming a signal path, which conductors or wires 30A, 30B may carry or transmit power and/or digital data signals. In this way, a signal path may be formed or arranged between the image intensifier 10, image sensor 73, control unit 40, and any storage device or memory therewith, permitting the transmission of an electronic signal there between. The connection point of image intensifier 10 with such signal path may also be referred to as its "output." However, the phrase "signal path" should also be construed as including wireless or optical embodiments of conducting electronic signals.

The control unit 40 may include or be integrated with a data storage device or medium, and may include a fastening device 41, such as clips, that fasten the control unit 40 to clothing, webbing, belts or the like. Fastening device 41 may also engage with a receptacle affixed to or worn by one of a human, animal, machine, or other bodily equipment worn by the host. The memory or data storage device of control unit 40 may include a hardened case that is weatherproof and shock resistant and may be formed from a variety of lightweight materials including aluminum or composite. The memory device of control unit 40 may include a programmable memory arranged in a shock proof configuration such that damage will be prevented when used during rugged operations. The memory device of control unit 40 may further include a software process or a mode of operation wherein pixel data from an initial frame is compared to pixel data from a sampled image to determine a difference in value. If a pixel's value changes then the pixel data is stored. Otherwise, if no changes have been made to the pixel's value then it is understood that part of the image has not changed and when signal processing occurs during an image displaying process, the part of the image with the unchanged pixel values remain the same. Thus, the invention may be left for long periods of time and the memory storage ability of the memory device is extended. The memory storage device 40 may also be solid state, without operating drives. Optionally, control unit 40 or image intensifier 10 may include a digital capture system that applies a stamp to an image of an object of interest. The capture system may incorporate elements desired for the application, such as a digital clock for a time stamp, or a global positioning system receiver for a stamp of location.

Figure 1B:
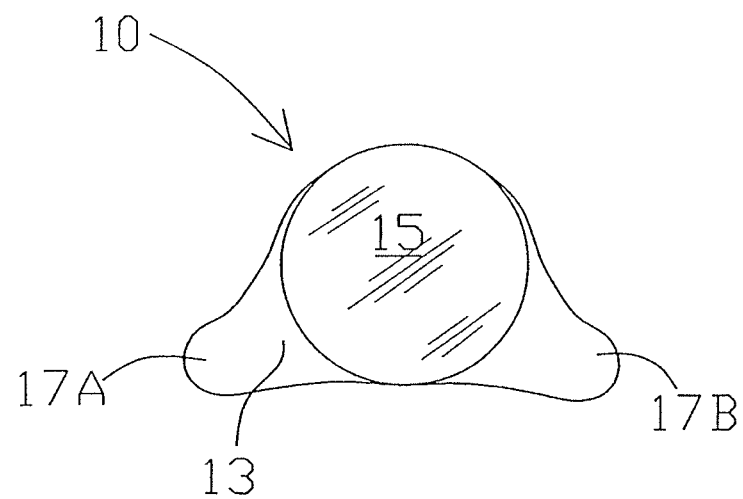
FIG. 1B is a front view of the image intensifier device.
Figure 1C:
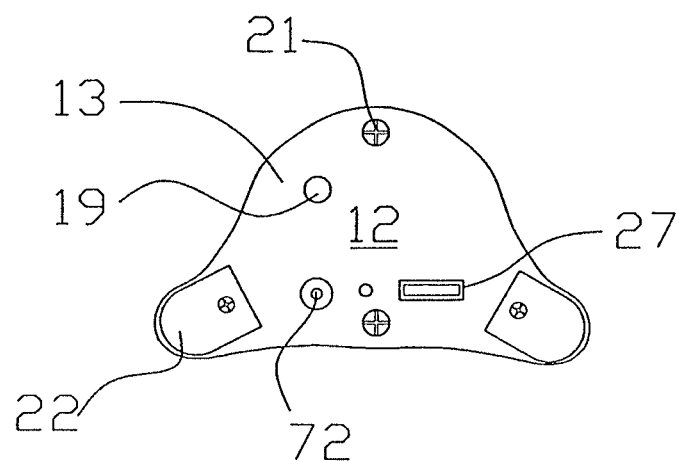
FIG. 1C is a back view of the image intensifier device.

Turning now to FIGS. 1B and 1C, image intensifier 10 may be disposed within a protective case 13, such that it surrounds the image intensifier 10; protective case 13 may be formed from metal, composite, resin or the like. Image intensifier 10 within protective case 13, and with supporting elements, forms imaging assembly 5. The case 13 may optionally include a plurality of hollow elongated lobes 17A, 17B arranged on opposite sides of lens 15, which may support internal contacts at opposite ends for receiving respective batteries therein and conducting voltage from ends of the batteries. As can be recognized by the various views, the bottom of the protective case 13 may be curved to conform to a curved top of the helmet 100 in both the front to back length and side-to-side width of the device; other shapes may be appropriate with other applications. In one embodiment, a battery may be inserted through battery access panel 22, which may be accessed through a screw or other fastener. Power switch 19 may be provided for energizing the night vision system 1 and image intensifier 10; it may be a sealed switch with a rubber dust boot overlaying the switch to prevent contamination of the internal workings of the switch. Screws 21 may be removed to provide access to the internal working components within the image intensifier 10 for cleaning and servicing operations. A weatherproof connector 27 may be provided on the back side 12 of the image intensifier device 10 for accepting an end of wire 30A to provide digital images to the data storage device 40. A second analog port 72 may be provided for coupling the night vision device to a small handheld screen for selecting a distance object of interest and focusing the lens thereon. A dust cover, not shown, may be attached to the case for protecting the various parts from contamination by dust.

Figure 2A:
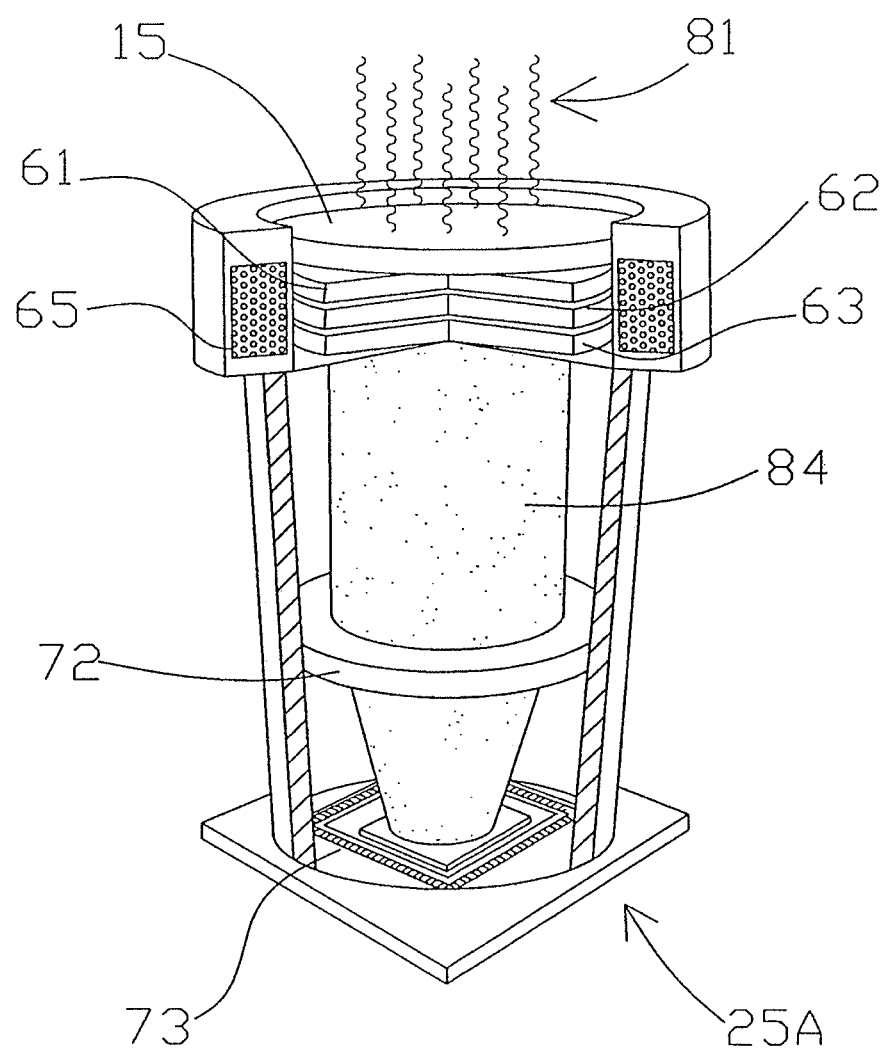
FIG. 2A shows a first embodiment of the invention where a second lens is used to focus an image on the illuminated screen onto an image detection chip or sensor.
Figure 2B:
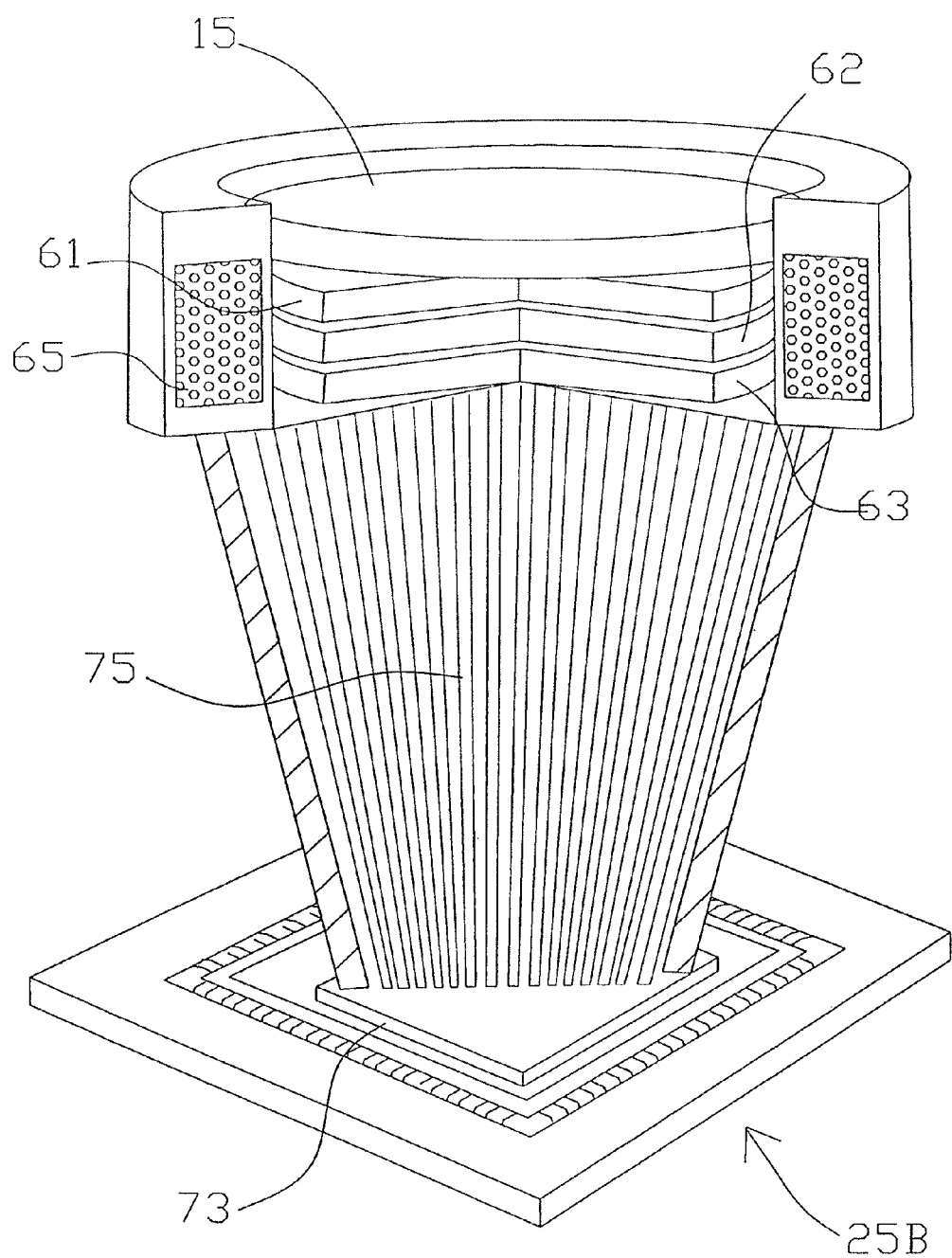
FIG. 2B shows a second embodiment of the invention where a plurality of fiber optics directs the displayed image onto the image detection chip.

FIGS. 2A and 2B show two different configurations of an image intensifier tube 25A, 25B. In one instance, the image intensifier 10 may be arranged atop the helmet 100. In an alternative embodiment, the image intensifier 10 may be arranged on one side of the helmet 100. As noted above, mounting device 105 may engage with a receptacle affixed to a host, which can be human, animal, machine, or bodily worn equipment of such a host or wearer. In one embodiment, mounting device 105 may be rotatable, e.g., rotatable with respect to helmet 100 to permit relative rotation of image assembly 5 with image intensifier 10.

In FIG. 2A, photons 81 enter the objective lens 15 and are converted into electrons via photocathode 61. An electron multiplier 62 increases the number of electrons and directs them onto screen 63 which emits photons 84 that are focused onto an image sensor 73 via second or relay lens 72. High voltage power source 65 is provided around the photocathode 61, electron multiplier 62 and screen 63. The image sensor 73 connects to a signal conductor or path arranged within connector 27 to provide digital images to the memory device/control unit 40.

As can be understood by viewing FIG. 2B, the photons emitted by screen 63 are directed onto the image sensor 73 via a fiber optic coupler 75 that includes a bundled, tapered plurality of fibers.

Figure 2C:
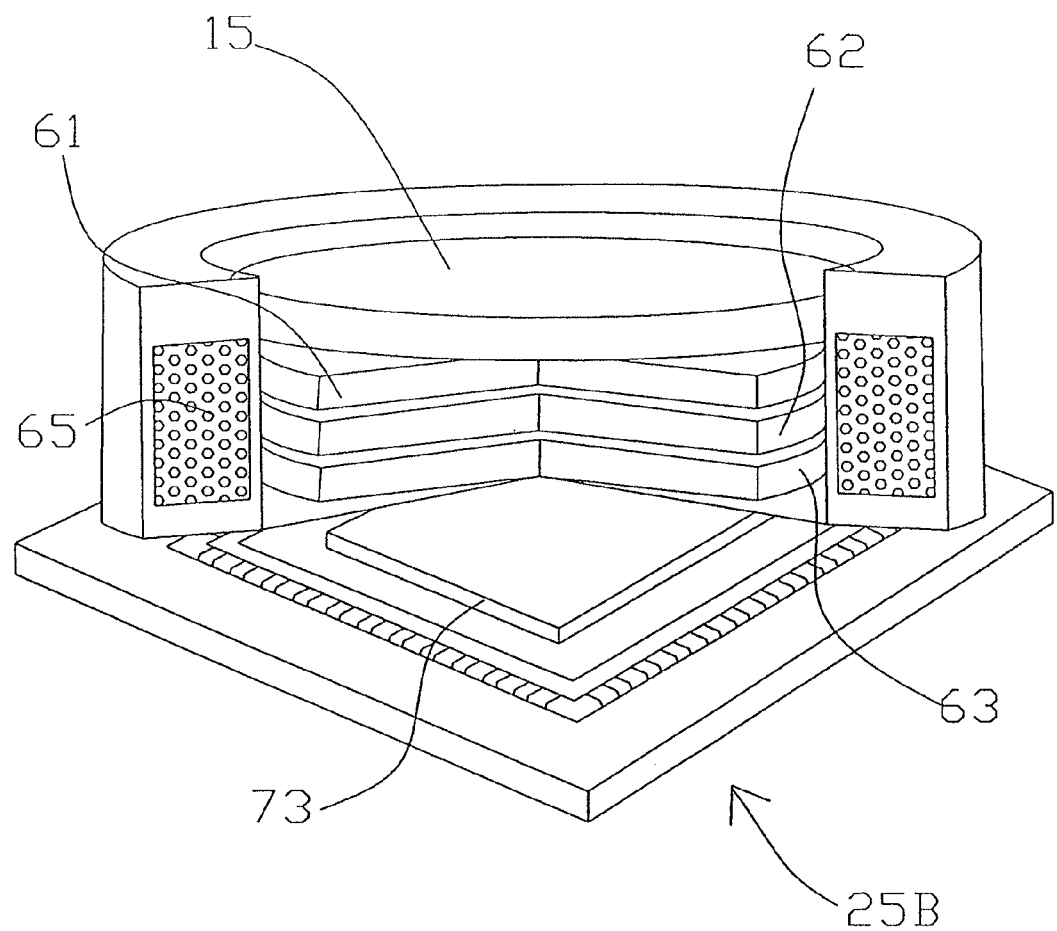
FIG. 2C shows a third embodiment of the invention wherein, the illuminated screen is disposed in close proximity to the image detection chip.

FIG. 2C shows a third embodiment wherein an illuminated screen is disposed in close proximity to the image sensor 73 in the form of an image detection chip, also referred to as a semiconductor image chip. In this instance, there are no relay lens or fiber optic bundles to relay the image onto image sensor 73. Thus, the image screen 63 and the image sensor 73 may be arranged substantially near one another to reduce the overall length of the image intensifier 10 for such embodiments. The image sensor 73 converts the image projected thereon into a digital or analog signal as discussed herein.

Figure 4:
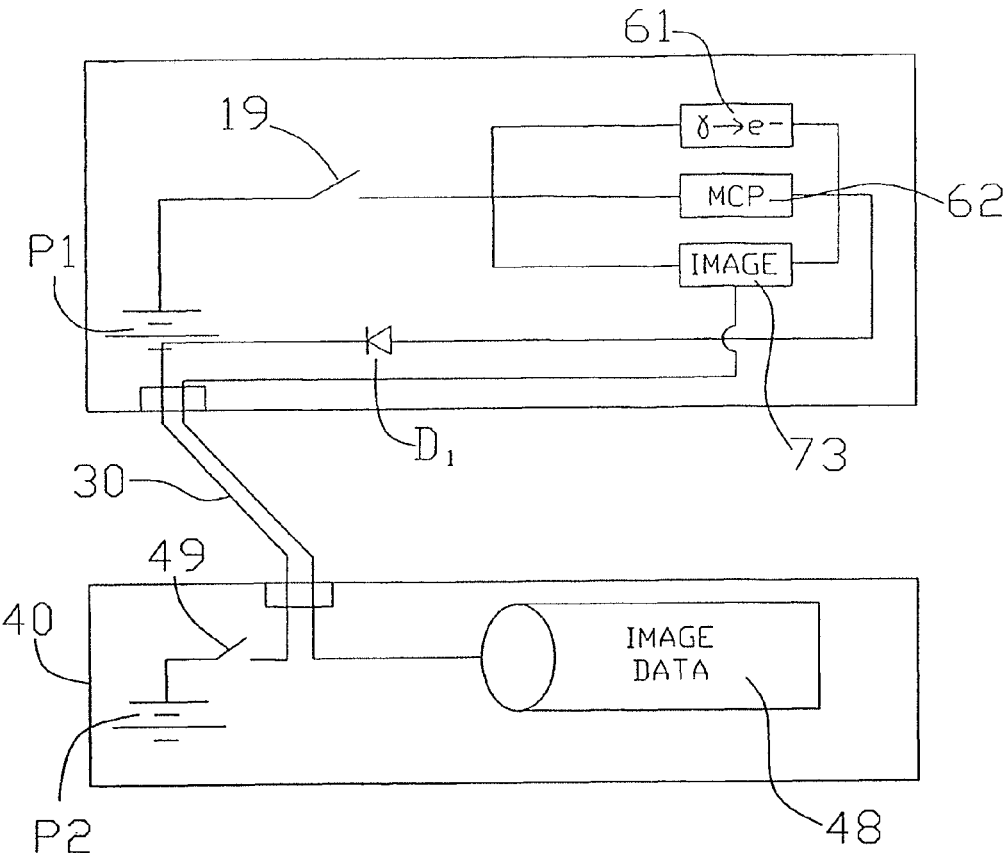
FIG. 4 shows a first electrical schematic for sharing the power between the night vision device and the data storage device.

FIG. 4 shows a schematic having two power sources and how a first power source P1 may be supplied with energy by the second power source P2. Cables, conductors, or wires 30A, 30B are collectively represented as element 30 in this schematic view. When switch 19 is closed, power is flowed into the photocathode 61, MCP 62, and image sensor 73. Over time the magnitude of the voltage of P1 decreases. Switch 49 may be closed through electronic circuitry or manually by the operator to couple power source P2 to P1 for aiding in powering the image intensifier 10. Database 48 may also be powered by power source P2. Diode D1 may be provided for ensuring that a potential will be seen across the various devices 61, 62, 63 when P2 is coupled to P1. A microphone circuit and corresponding components including conductors and signal processors may be included for recording sound to the database 48.

Figure 5:
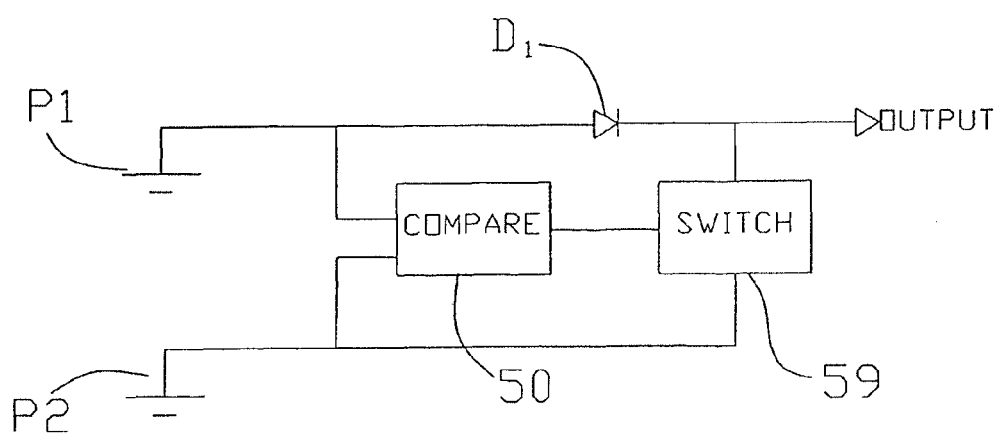
FIG. 5 is a second electrical schematic of the night vision system including a comparator circuit that turns on when a voltage potential measured across the first power source drops below a preset threshold when compared to the voltage potential of the second power source.

FIG. 5 shows an electronic circuit that may be included in either the image intensifier 10 or the data storage device/control unit 40. P1 and P2 are connected to inputs of a comparator chip 50. When P1 drops to a predetermined magnitude, comparator 50 provides an output signal to switch 59, which may be a transistor, relay or the like that allows P2 to be output to drive the various components of or supporting image intensifier 10. Diode D1 prevents power from flowing back into P1.

Figure 6:
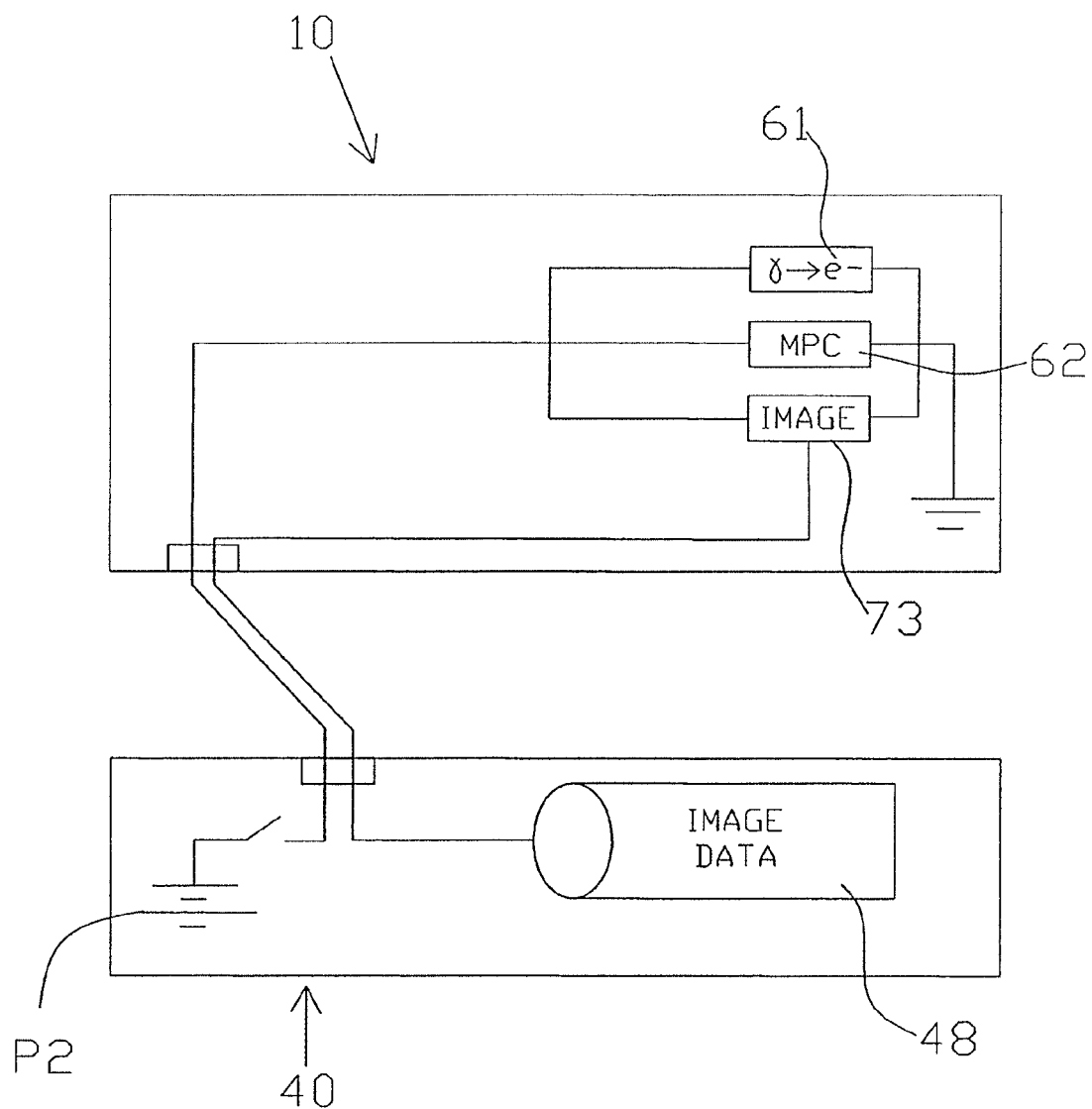
FIG. 6 is a third electrical schematic of the night vision system wherein a single power source is arranged in the control unit that houses the data storage device.
Figure 8:
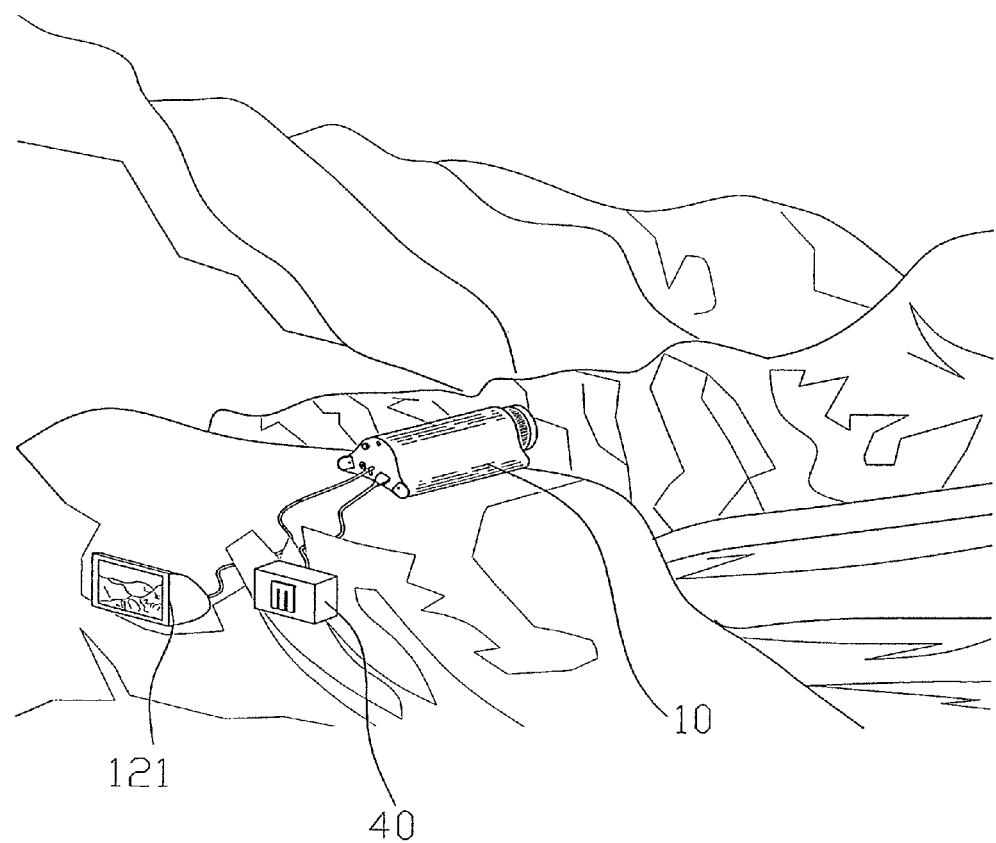
FIG. 8 shows the night vision system deployed in a remote operating condition and having a small display screen 121 coupled to one of the signal ports. In this instance, an operator can arrange the night vision device atop an element of the terrain and continually monitor a particular object of interest without being exposed.

FIG. 6 is a third electrical schematic of a portion of the night vision system 1 wherein image intensifier 10 includes a single power source P2 arranged or disposed in the data storage device or control unit 40. In this instance, a single power source is provided in the memory storage device. This power source provides a voltage supply to both the memory storage device and the night vision system 1 as shown.

FIGS. 7A-7C shows an embodiment of the image intensifier 10 with an adjustable zoom lens 15 having graduated marks for focusing the first lens at a distance. The lens 15 may be equipped with external threads that mate with the internal threads provided on within the opening that receives the lens 15, as shown. This type of coupling between the lens and the night vision device may be a C-coupler as used in camera equipment. In either case, the lens 15 may be quickly removed and replaced. In FIG. 7C, the device is equipped with the various features as previously discussed.

All components disclosed herein are configured for use in all types of weather conditions. All components should comply with U.S. Military Specifications. Various dust covers, dust boots, rubber seals, gaskets and the like may be used to cover the various parts of the system.

Figure 9A:
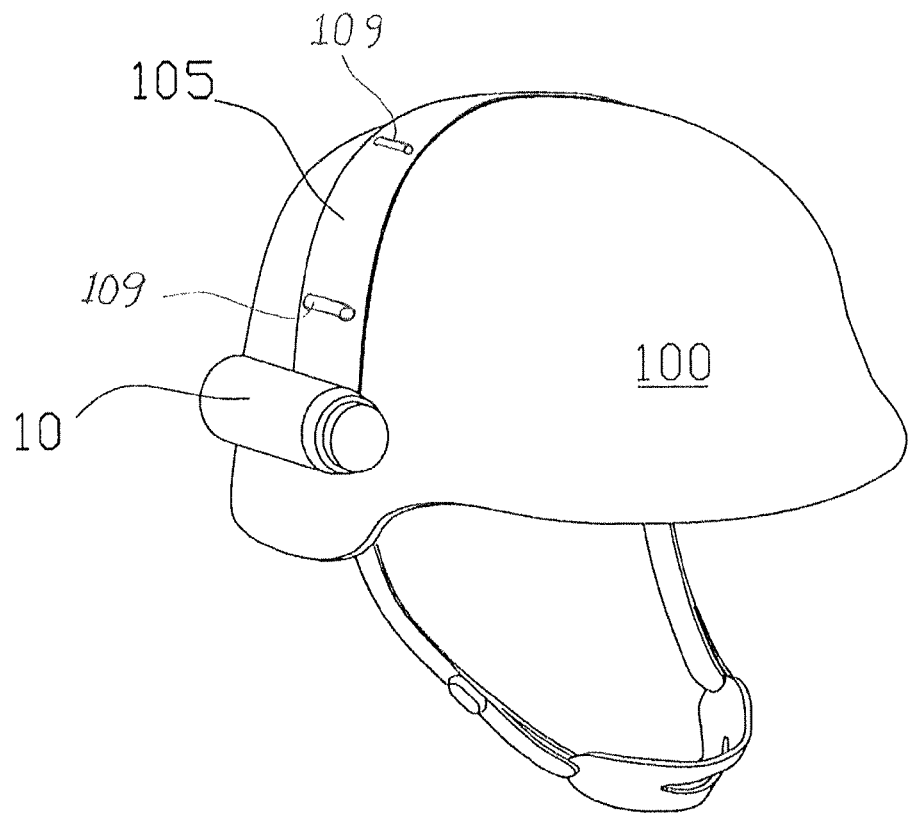
FIG. 9A is a front view of an additional embodiment of the invention showing the image intensifier device mounted on an opposite side of a protective helmet from a control unit that comprises a memory and power source. A strap passes across the top of the protective helmet and couples the control unit and the image intensifier unit together.
Figure 9B:
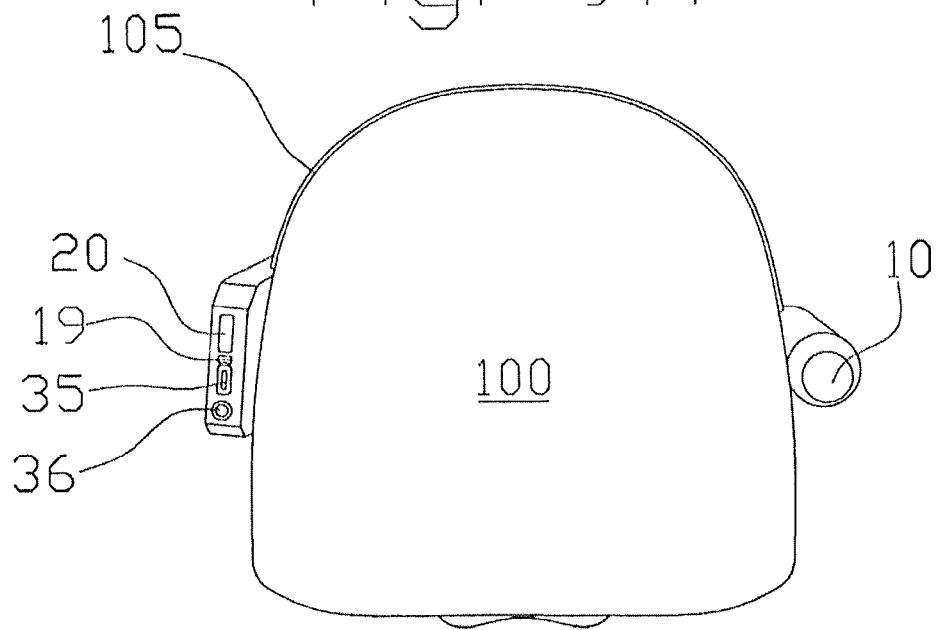
FIG. 9B is a back view of the system and showing the control unit and associated features present thereon.

FIGS. 9A and 9B show an alternative arrangement and showing the image intensifier 10 and the control unit 40 which includes a memory mounted on opposite sides of the helmet 100. A power source is included in the control unit and may be configured as previously mentioned. A strap 105 is a mounting means for mounting both the image intensifier tube 10 and the control unit 40 to the helmet 100. Strap 105 passes across the top of the protective helmet 100 and couples the control unit 40 and the night vision device 10 together. In this instance, the strap 105 comprises power and signal wires (or signal path) coupling the control unit 40 to the image intensifier 10 to provide data signal and power there between. The strap may be a Velcro strap that couples the system 1 to the helmet 100. Optionally, mounting device 105 may be a securing device configured to mount the imaging assembly 5 to a helmet 100 by engaging a helmet rail attachment system on the helmet 100, thereby securing the image intensifier 10.

It is preferred that the image intensifier 10 is substantially the same weight as the control unit 40 to balance the two on the helmet 100 without creating an unbalanced load on the operator's neck. The objective lens 15 provided on the image intensifier 10 is preferably a wide angle lens with an angle of substantially ninety to one hundred degrees. The image intensifier tube is preferably equipped with a black and white CMOS image sensor that produces a digital High Definition signal having a resolution of 1920/1080p and a video screen ratio of 16:9. It is understood that other resolutions may be provided as well as different screen viewing ratios. Lens 15 may also be a zooming lens, depending on the application.

FIG. 9B is a back view of the system and showing the control unit 40 and associated features present thereon. In this instance, the control unit 40 includes a positive on/off switch 19, an erase/format button 20, a Universal Serial Bus output port 35 for use with viewing screens/glasses/downloading stored images from the memory. The USB output port 35 may also be used for recharging onboard batteries or power source of the control panel. A separate DC power port 36 is also shown for use in providing an alternative power source or recharging the onboard batteries or power source. It is preferred that the control panel includes at least a 16 GB solid state memory.

The onboard power source may be 3-4 hour Lithium rechargeable batteries.

Figure 10:
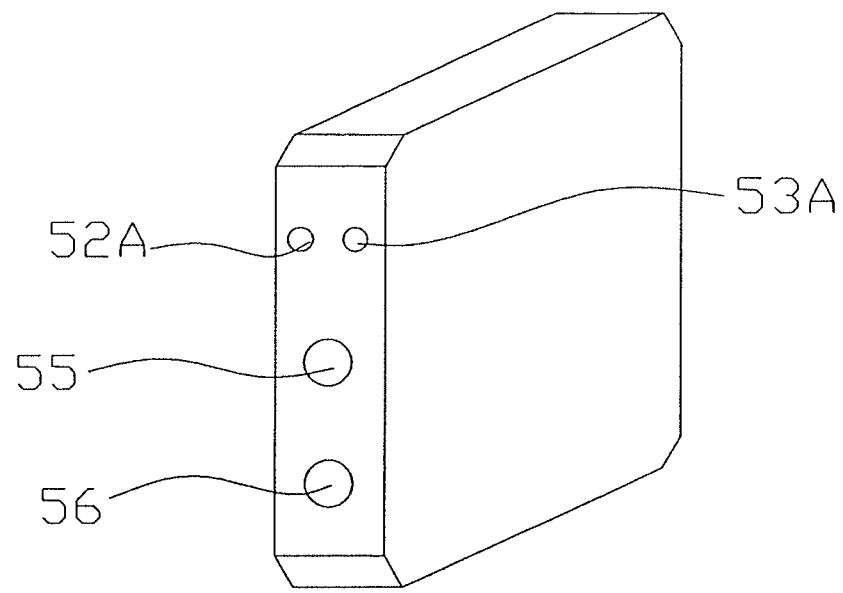
FIG. 10 is a front view of the control unit and exhibiting a plurality of openings having a pair of microphones, a pinhole camera and a photocell mounted therein.

FIG. 10 is a front view of an embodiment of the control unit 40 and exhibiting a plurality of openings having microphones 52A, 52B, a pinhole camera 55 and a photocell 56 mounted therein. The microphones 52A, 52 operate as left and right microphones for providing a stereo sound recording that is stored in the memory of the control unit. The pinhole camera 55 operates as a daytime camera for recording digital images to the memory during daylight hours. The photocell 56 functions as a switching mechanism, in accord with the schematic of FIG. 11 to automatically switch inputs to the memory between the daytime pinhole camera 55 and the image intensifier tube 10. Alternatively, microphones 52A, 52B, a pinhole camera 55 and a photocell 56 may be mounted within the imaging assembly.

Figure 11:
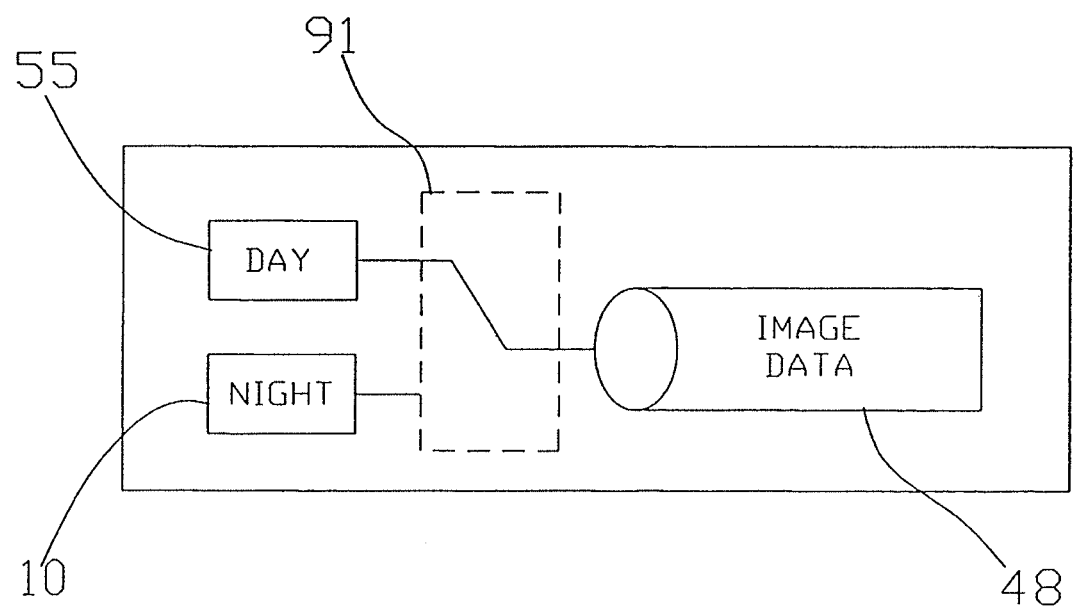
FIG. 11 is a schematic view of an additional embodiment of the invention and showing the photocell that switches between the pinhole camera (daytime) and the image intensifier device.

FIG. 11 is a schematic view of an additional embodiment of the invention and showing the photocell that switches between the pinhole camera (daytime) and the night vision device. As can be understood by the skilled artisan, the photocell operates in conjunction with a comparator (not shown) to bias the comparator into a particular state whereby either the output of the daytime camera 55 is sampled and stored during daylight hours or the output of the image intensifier tube 10 is sampled and stored during nighttime hours. In this manner, the operator does not need to switch between the two different cameras. It may be recognized that switch 91 may also be manually configured to provide an input to the image data storage device 48.

Another embodiment of the hands free night vision system 1 may involve the transmission of electronic signals. System 1 includes an imaging assembly 5 with a protective case 13 and an image intensifier 10 having a first end 11 and a second end 12. The first end 11 may have an objective lens 15 that accepts photons from a low light image of an object of interest. Image intensifier 10 may then convert these photons into an electronic signal representative of the low light image of the object of interest. An output arranged at the second end 12 of the image intensifier 10 that outputs the electronic signal representative of the low light image of the object of interest, said image intensifier 10 being disposed within the protective case 13.

The night vision system 1 includes a power source P operably coupled to the imaging assembly 5 and providing power thereto to the system 1, and to enable the conversion of light into an electronic signal representative of the low light image of the object of interest. A control unit 40 is also operably engaged or coupled to the imaging assembly 5. The system 1 may have a mounting device 105 for mounting the imaging assembly 5 and image intensifier 10 onto a body, host, or wearer, such as a canine. The system 1 may include a transmission system 9, wherein image intensifier 10, control unit 40, and transmission system 9 are in electronic communication to transmit the electronic signal therebetween. Optionally, such a night vision system 1 may have a transmission system 9 that includes a port 9P (e.g., FIG. 14) configured to receive electronic connectors of external cables (not shown) to enable electronic communication to an external transmitter for transmission of the electronic signal. Alternatively, the transmission system 9 may include a transmitter 30T (e.g., FIG. 13) for transmission of the electronic signal in a format compatible with a tactical data exchange network. Such alternative may further include a multiplexer within transmitter 30T for time division multiplexing of the electronic signal.

Figure 13:
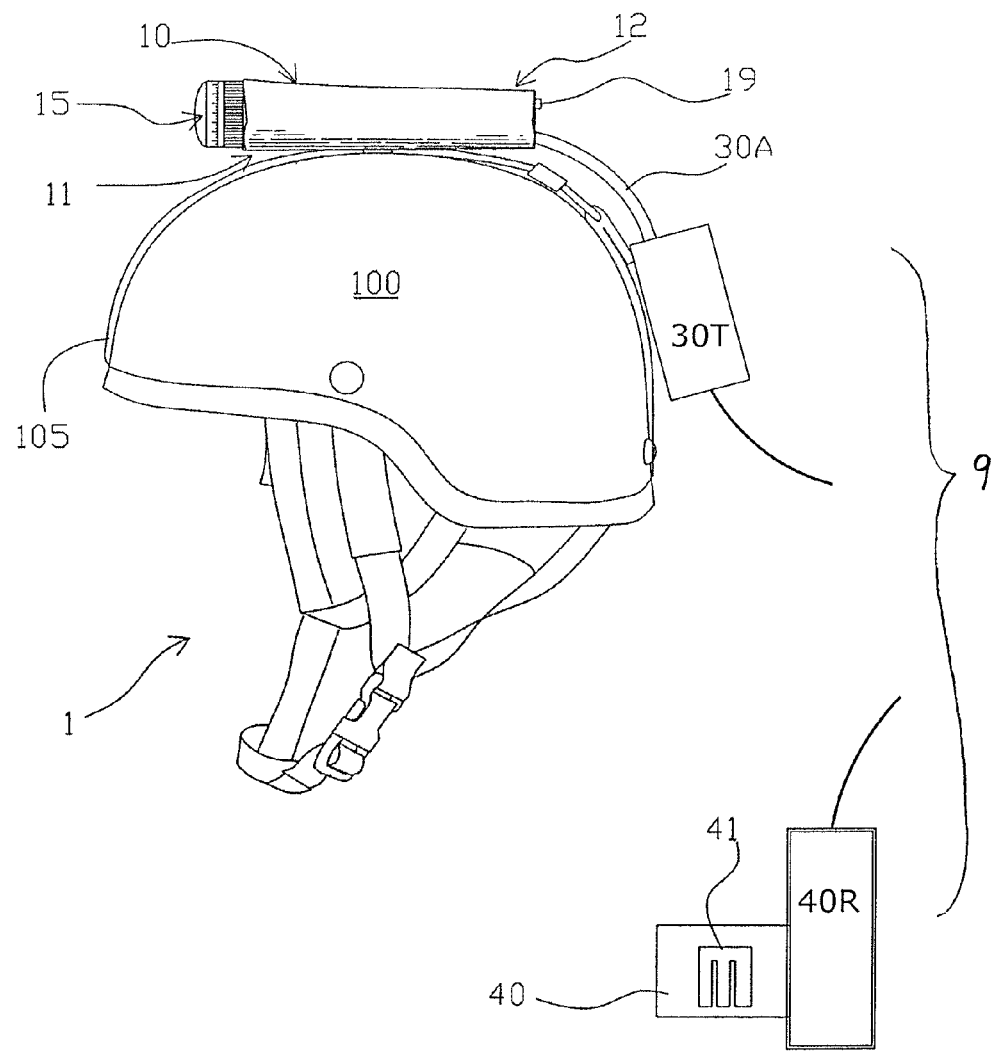
FIG. 13 shows a wireless embodiment of the night vision system showing wireless transmission to control unit 40.
Figure 14:
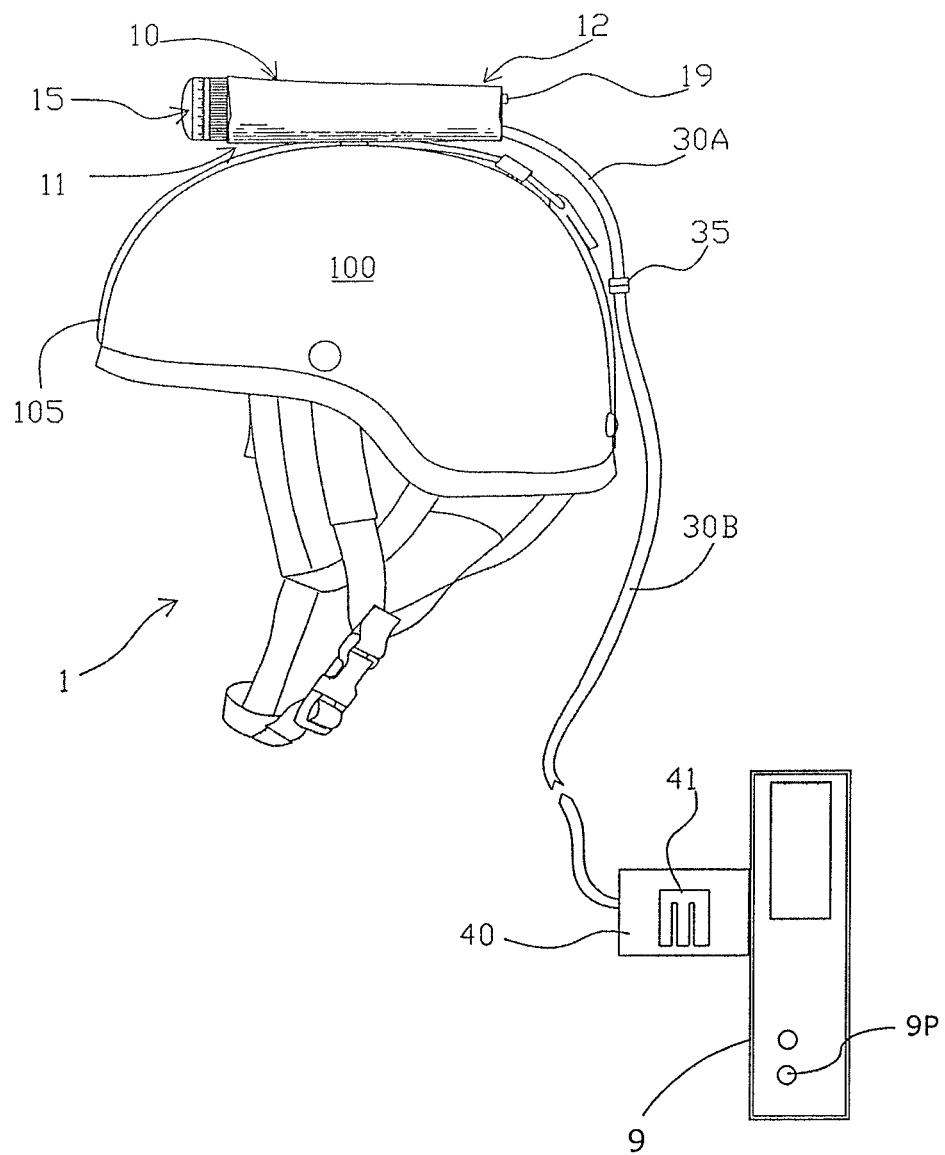
FIG. 14 shows an embodiment of the night vision system showing an ability to inter-relate with an external transmitter.

Thus, transmission system 9 is intended to encompass 'internal' and 'external' embodiments. For example, an external embodiment shown in FIG. 14 might be adapted to function with external transmitters, such any of a variety of radio, optical, or satellite transmitters. An internal embodiment with local transmission is shown in FIG. 13, with onboard transmitter 30T and local receiver 40R operably engaged with control unit 40. Alternatively, the transmission may be longer range, reaching a remote receiver. Transmission system 9 may include appropriate supporting systems for the application; such supporting systems may include a power supply, video compression processor or module, image signal coupling or wiring, cryptographic modules, etc. An external embodiment may provide some or all supporting systems within the external transmitter of a radio or telephone.

In another embodiment, the night vision system 1 may include an imaging assembly 5 with a protective case 13 and an image sensor 73 disposed in the protective case that accepts light from an image of an object of interest and converts said light into an electronic signal representative of the light image of the object of interest. Power source P may be operably coupled to the imaging assembly 5 and provide power to the image sensor 73 to convert the light into the electronic signal representative of the low light image of the object of interest. A control unit 40 may be operably coupled to the imaging assembly 5 and may include a memory that accepts and stores the electronic signal representative of the low light image of the object of interest. The system 1 may include a mounting device 105 for mounting the imaging assembly 5 and/or image intensifier 10 onto a helmet 100 or other host. An electronic signal path 30 may be arranged or disposed between the image sensor 73, control unit 40 and its memory, for transmits the electronic signal there between. Optionally, hands free night vision system 1 may have an image sensor 73 in the form of a short wave infrared range sensor, a thermal energy sensor, or one of a low light charge coupled device or a complementary metal oxide semiconductor device.

While the invention has been described with respect to preferred embodiments, it is intended that all matter contained in the above description or shown in the accompanying drawings shall be interpreted as illustrative and not in limiting sense. From the above disclosure of the general principles of the present invention and the preceding detailed description, those skilled in the art will readily comprehend the various modifications to which the present invention is susceptible. Therefore, the scope of the invention should be limited only by the following claims and equivalents thereof.

What is claimed is:
1. A hands free night vision system comprising:
an imaging assembly comprising
a protective case,
an image intensifier disposed within the protective case, the image intensifier having a first end and a second end; said first end having an exposed objective lens that accepts photons from a low light image of an object of interest and with an image sensor converts said photons into an electronic signal representative of the low light image of the object of interest, an output that outputs the electronic signal representative of the low light image of the object of interest;

a power source coupled to the imaging assembly and providing power thereto to the image intensifier to convert the light into the electronic signal representative of the low light image of the object of interest;

a control unit coupled to the imaging assembly and comprising a memory that accepts and stores the electronic signal representative of the low light image of the object of interest;

a mounting device for mounting the imaging assembly onto a helmet; and, a signal path arranged between the image intensifier image sensor and the control unit memory, and that transmits the electronic signal there between.

2. The hands free night vision system of claim 1 wherein said mounting device is a securing device to mount the imaging assembly by engaging a helmet rail attachment system on the helmet, securing the image intensifier thereto.

3. The hands free night vision system of claim 1 wherein said mounting device is a strap fixed to the helmet securing the imaging assembly to the top of the helmet.

4. The hands free night vision system of claim 1 wherein said mounting device is Velcro.

5. The hands free night vision system of claim 1 wherein said imaging assembly is rotatably mounted to the helmet by the mounting device, permitting rotation of the image intensifier relative to the helmet.

6. The hands free night vision, system of claim 1 further comprising a pair of microphones that generate sounds which are recorded in the memory, an imaging switch, and a camera to produce images which are sampled and stored in the memory, and the imaging switch is operably disposed within the signal path for switching input to the memory between the image intensifier and the camera.

7. The hands free night vision system of claim 6 wherein the camera is configured for daylight imaging, and the imaging switch comprises a photocell that automatically detects daytime light or nighttime light and aligns the signal switch and signal path to the camera for daytime and to the image intensifier for nighttime.

8. The hands free night vision system of claim 1 wherein said memory is a solid state memory.

9. The hands free night vision system of claim 1 wherein said control unit includes a positive on/off switch, an erase/format button, and an output port for use with viewing screens or glasses or downloading stored images from the memory, said output port also being used for recharging onboard batteries or power source of the control panel.

10. The hands free night vision system of claim 1 wherein said signal path is a flexible cable.

11. The hands free night vision system of claim 1 wherein said lens is a wide angle lens.

12. The hands free night vision system of claim 1 wherein said lens is a zoom lens.

13. The hands free night vision system of claim 1 wherein the lens is coupled to the image intensifier by a threaded coupler.

14. The hands free night vision system of claim 1 wherein the image intensifier comprises an image sensor that is one of a charge coupled device or a complementary metal oxide semiconductor device.

15. The hands free night vision system of claim 1, further comprising a capture system that time stamps the image of the object of interest.

16. The hands free night vision system of claim 1, further comprising an image capture system that stamps the image of the object of interest with location from a global positioning system device.

17. The hands free night vision system of claim 1, further comprising an infrared light source attached to the imaging assembly to emit infrared light to enhance capability of image intensifier to gather light.

18. The hands free night vision system of claim 1, wherein the lens of the imaging assembly is a first lens, the imaging assembly further comprising:

a second lens;

a photocathode arranged in proximity to the first lens, said photocathode converting photons received by the first lens into a first plurality of electrons;

a micro-channel plate arranged in proximity to the photocathode to convert the first plurality of electrons into a second plurality of electrons having a larger magnitude than the first plurality of electrons;

a screen arranged in proximity to the micro channel plate and being struck by the second plurality of electrons, said screen comprising a material that fluoresces when struck by the second plurality of electrons to produce an image representative of the low light image; and, a semiconductor image chip that converts said image representative of the low light image into a digital signal; and, the second lens is arranged between said screen and said semiconductor image chip to focus the image representative of the low light image onto the semiconductor image chip.

19. The hands free night vision system of claim 1, wherein the image intensifier further comprises:

a photocathode arranged in proximity to the lens, said photocathode converting photons received by the lens into a first plurality of electrons;

a micro-channel plate arranged in proximity to the photocathode to convert the first plurality of electrons into a second plurality of electrons having a larger magnitude than the first plurality of electrons;

a screen arranged in proximity to the micro channel plate and being struck by the second plurality of electrons, said screen comprising a material that fluoresces when struck by the second plurality of electrons to produce an image representative of the low light image;

an image sensor that converts said image representative of the low light image into a digital signal; and, a plurality of fiber optics arranged between said screen and said semiconductor image chip to focus the image representative of the low light image onto the image sensor.

20. The hands free night vision system of claim 1, wherein the image intensifier further comprises:

a photocathode arranged in proximity to the lens, said photocathode converting photons received by the lens into a first plurality of electrons;

a micro-channel plate arranged in proximity to the photocathode to convert the first plurality of electrons into a second plurality of electrons having a larger magnitude than the first plurality of electrons;

a screen arranged in proximity to the micro channel plate and being struck by the second plurality of electrons, said screen comprising a material that fluoresces when struck by the second plurality of electrons to produce an image representative of the low light image;

an image sensor that converts said image representative of the low light image into a digital signal; and, said screen and said semiconductor image chip arranged in direct contact to focus the image representative of the low light image onto the image sensor.

21. A hands free night vision system comprising:
an imaging assembly comprising a protective case and an image intensifier having a first end and a second end; said first end having an objective lens that accepts photons from a low light image of an object of interest and converts said photons into an electronic signal representative of the low light image of the object of interest, an image intensifier output that outputs the electronic signal representative of the low light image of the object of interest, said image intensifier disposed within the protective case;
a power source coupled to the imaging assembly and providing power thereto to convert the light into the electronic signal representative of the low light image of the object of interest;
a control unit coupled to the imaging assembly and comprising a memory that accepts and stores the electronic signal representative of the low light image of the object of interest;
wherein the image intensifier and control unit are in electronic communication to transmit the electronic signal therebetween; and
a mounting device for mounting the image intensifier onto a body.

22. The hands free night vision system of claim 21, wherein said mounting device operably engages with a receptacle worn on the body of a human, animal, or machine.

23. A hands free night vision system comprising:
an imaging assembly comprising a protective case and an image intensifier having a first end and a second end; said first end having an objective lens that accepts photons from a low light image of an object of interest and converts said photons into an electronic signal representative of the low light image of the object of interest, an output arranged at the second end of the image intensifier that outputs the electronic signal representative of the low light image of the object of interest, said image intensifier disposed within the protective case; a power source coupled to the imaging assembly and providing power thereto to the system and to convert the light into the electronic signal representative of the low light image of the object of interest;
a control unit coupled to the imaging assembly;
a mounting device for mounting the image intensifier onto a body;
a transmission system; and
wherein the image intensifier, control unit, and transmission system are in electronic communication to transmit the electronic signal therebetween.

24. The hands free night vision system of claim 23, wherein the transmission system comprises a port configured to receive electronic connectors of cables to enable electronic communication to an external transmitter for transmission of the electronic signal.

25. The hands free night vision system of claim 23 wherein the transmission system further comprises a transmitter for transmission of the electronic signal in a format compatible with a tactical data exchange network.

26. The hands free night vision system of claim 25 wherein the transmission system further comprises a multiplexer for time division multiplexing of the electronic signal.

27. A hands free night vision system comprising:
an imaging assembly having a protective case and an image sensor disposed in the protective case that accepts light from an image of an object of interest and converts said light into an electronic signal representative of the light image of the object of interest;
a power source coupled to the imaging assembly and providing power to the image sensor to convert the light into the electronic signal representative of the low light image of the object of interest;
a control unit coupled to the imaging assembly and comprising a memory that accepts and stores the electronic signal representative of the low light image of the object of interest;
a mounting device for mounting the image intensifier tube onto a helmet; and,
a electronic signal path arranged between the image sensor, control unit and memory that transmits the electronic signal there between.

28. The hands free night vision system of claim 27 wherein image sensor is a short wave infrared range sensor.

29. The hands free night vision system of claim 27 wherein the image sensor is a thermal imaging sensor configured to produce the electronic signal representative of the low light image of the object of interest by using sensing thermal energy.

30. The hands free night vision system of claim 27 wherein image sensor is one of a low light charge coupled device or a complementary metal oxide semiconductor device.

* * * * *